(No Model.)

S. STOUT.
GATE.

No. 606,250. Patented June 28, 1898.

Witnesses
Harry S. Rohrer
George M. Richards

Inventor
Samuel Stout
By Henry N. Copp.
Attorney

UNITED STATES PATENT OFFICE.

SAMUEL STOUT, OF NEWCOMB, ILLINOIS.

GATE.

SPECIFICATION forming part of Letters Patent No. 606,250, dated June 28, 1898.

Application filed September 17, 1897. Serial No. 651,973. (No model.)

*To all whom it may concern:*

Be it known that I, SAMUEL STOUT, a citizen of the United States, residing at Newcomb, in the county of Champaign and State of Illinois, have invented certain new and useful Improvements in Gates; and I do hereby declare the following to be a full, clear, and exact description of the invention, such as will enable others skilled in the art to which it appertains to make and use the same.

The gate of this invention is of the general class in which the gate is opened or closed, as the case may be, by a pull upon the free end of either of two centrally-pivoted levers extending oppositely from the gate approximately parallel to the roadway and so located that they may be conveniently operated from the ground or from a vehicle.

The object is to produce an inexpensive gate that in neatness, durability, ease of operation and of repair, and in non-liability to obstruction by snow or ice shall be more satisfactory than other gates commonly used.

Figure 1:
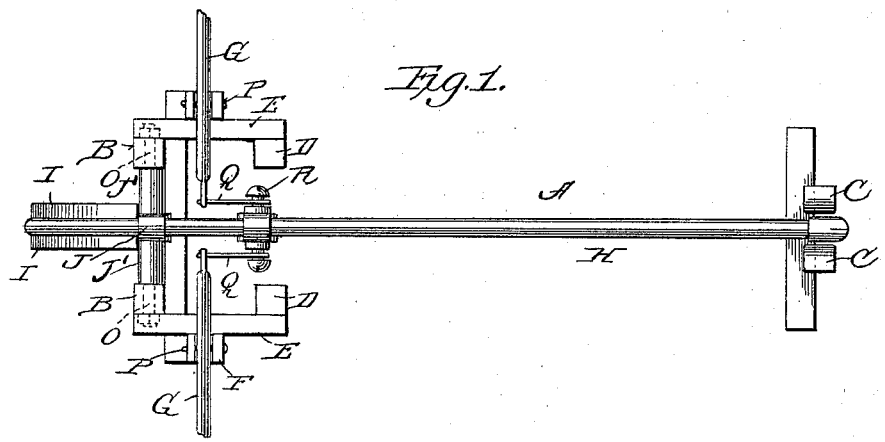
Figure 2:
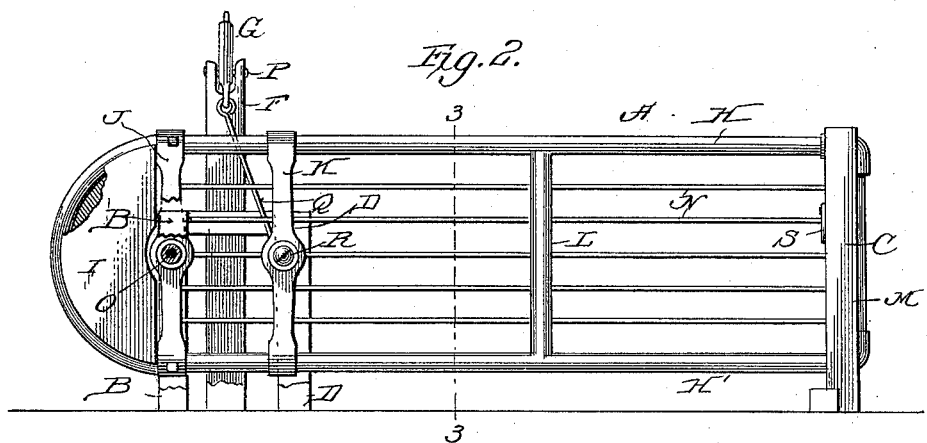
Figure 3:
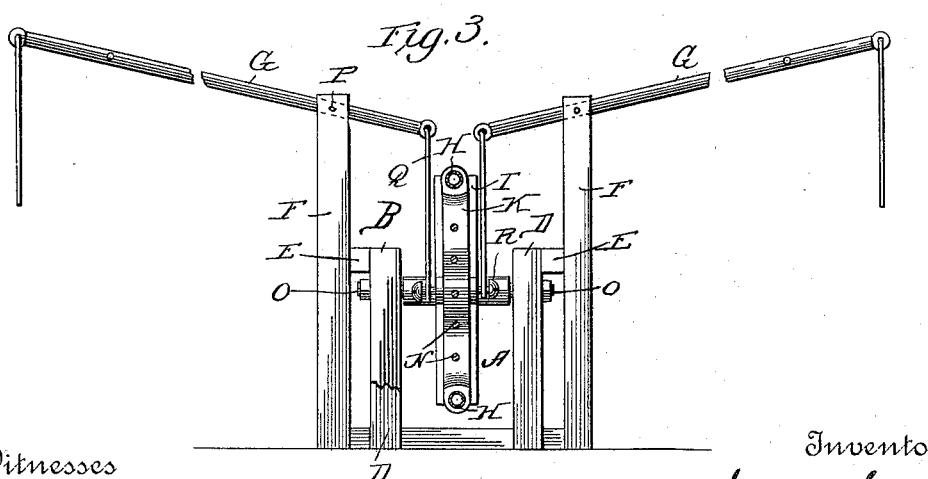

In the drawings, Figure 1 is a plan of the closed gate and its accessories. Fig. 2 is a side elevation, parts being broken away. Fig. 3 is a section at 3 3, Fig. 2.

In all the views where the letters appear, A is a gate centrally pivoted near one end to posts B B to swing in a vertical plane passing between these posts, between posts C C at the opposite side of the roadway, and also between a third pair of posts D D, preferably employed and placed between the posts B B and the roadway at such distance that their sides next the roadway are at a greater distance than the bottom of the gate from the pivotal axis, whereby they protect the open gate from passing hubs or axles. The posts B D upon the same side of the gate are connected at their upper ends by a bar E, and to the middle of each bar is secured a fulcrum-post F, extending above the gate to support one of the levers G G, by which the gate is operated. The upper and lower bars H H of the gate are the branches of a tube bent to U shape and forming at the pivotal end of the gate a semicircular bend connecting the branches. In this bend lies a semicircular counterweight I, circumferentially grooved to receive the frame-tube. A bar J, perforated at each end, is slipped over the free ends of the tube, carried against the counterweight, and then rigidly fixed to the tube branches by set-screws. A second and parallel bar K is in like manner secured at a short distance from the bar J, and midway between the bar K and the ends of the branches is placed a strut L. The free ends of the branches are then connected by a tubular end bar M, angle-couplings of common form being used.

The end bars, strut, and bars K J are all provided with registering perforations to receive small rods or wires N, parallel to the upper and lower sides of the gate. At the middle of the bar J arms J' project equally upon opposite sides to meet the posts B B, and a bolt O passes through both posts and axially through these arms to serve as a pivotal axis upon which the gate may swing. Obviously this long bearing holds the gate steady in its vertical plane during its movements. The pivots P of the operating-levers G G are removable, and the levers have at their inner ends links Q, whose lower ends are pivotally secured upon opposite sides to the middle of the bar K by a bolt R. The levers have at their outer ends duplicates of the links just mentioned and are each perforated at the proper distance from this end, so that in case of the breaking of a link at the inner end the outer end link may replace it, or the lever may be reversed instead.

The gate may be secured against opening by a hook S upon one of the posts C.

The counterweight and that portion of the gate upon the same side of the pivotal axis are very slightly overbalanced by the remaining portion of the gate, so that while the gate falls automatically after raising very little force is needed to open or close it. The force needed may be varied by adjusting either bar J or K.

The center of curvature of the counterweighted portion of the frame lies approximately in the pivotal axis, and hence snow and ice can hardly interfere with its operation, and ordinarily the usual shoveling out is wholly unnecessary. It may be noted also that the posts at the pivotal end of the gate are all connected, so as to afford mutual lateral support.

What I claim is—

1. The combination with the upper and lower bars integrally connected at one end to form a U-shaped whole, of the counterweight secured in the curved connecting portion, the perforated adjustable bar connecting the upper and lower bars adjacent to the said counterweight, the couplings and perforated bar connecting the upper and lower bars at their opposite ends, and the rods held in the perforations in the connecting-bars.

2. The combination with the pair of short posts, of the counterbalanced gate pivotally supported thereby, the second pair of short posts whose sides next the roadway are more distant than the bottom of the gate from the pivotal axis, the third pair of longer fulcrum-posts, levers pivoted to the latter posts and connected to the gate to swing it, and rigid ties connecting the three pairs of posts, substantially as set forth.

3. The combination with the frame made up of the tube bent to U shape and having its ends connected by the normally vertical bar, of the grooved counterweight, and the adjustable pivotal bar holding the counterweight in place.

In testimony whereof I affix my signature in presence of two witnesses.

SAMUEL STOUT.

Witnesses:
 H. L. KELLY,
 R. A. STURGEON.